Nov. 7, 1961 D. W. GUIVER ET AL 3,007,670
AUTOMATICALLY CLOSING VALVES
Filed Jan. 28, 1959 4 Sheets-Sheet 1

INVENTORS
DENNIS WILLIAM GUIVER
GEORGE CAMAC
BY
Dean, Fairbank & Hirsch
ATTORNEYS Nov. 7, 1961   D. W. GUIVER ET AL   3,007,670
AUTOMATICALLY CLOSING VALVES
Filed Jan. 28, 1959   4 Sheets-Sheet 4
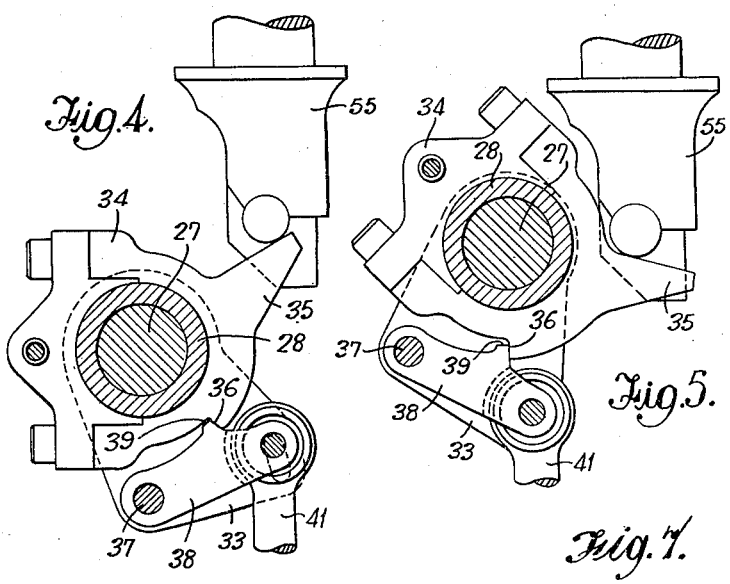
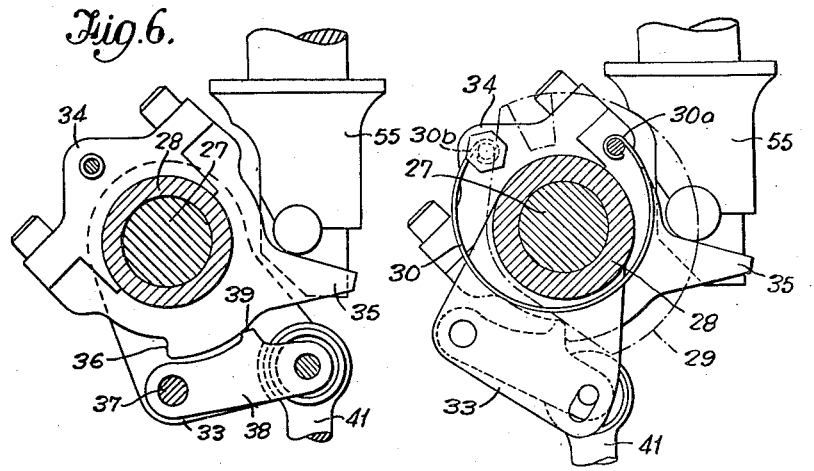
INVENTORS
DENNIS WILLIAM GUIVER
GEORGE CAMAC
By Dean, Fairbank & Hirsch
ATTORNEYS United States Patent Office 3,007,670
Patented Nov. 7, 1961

3,007,670
AUTOMATICALLY CLOSING VALVES
Dennis W. Guiver, Tarrant Rushton, Blandford, and George Camac, Mobberley, England, assignors to Flight Refuelling Limited, near Blandford, England, and A.E.I.-John Thompson Nuclear Energy Company Limited, London, England
Filed Jan. 28, 1959, Ser. No. 789,703
Claims priority, application Great Britain Feb. 4, 1958
8 Claims. (Cl. 251—67)

This invention relates to automatically closing valves for controlling orifices and providing a completely unobstructed opening of an orifice when the valve which controls it is open.

Such valves may be used, for example, to provide control of orifices leading into enclosed spaces containing noxious or dangerous gases.

An automatically closing valve according to the invention, comprises a valve disc mounted for movement towards and away from an internal seating at one end of an expansible and contractable sleeve to close and open the passage through the sleeve, resilient means acting on the valve disc through a one-way drive connection to urge it towards the internal seating, and biasing means acting on the valve disc to move it away from the seating when the load of the resilient means is removed, the one-way drive connection including a driving member displaceable against the resistance of the resilient means, to allow the valve to open, by movement of a further member connected to the said driving member by a latch device releasable by expansion of the sleeve to allow closing of the valve without return movement of said further member.

The valve disc may be hingedly mounted and may be biassed away from the internal seating by its own weight. Conveniently, the valve disc has movable with it a rotary member constituting the driven member of the one-way connection, the said rotary member being mounted coaxially with the driving member of the coupling and the resilient means comprising spiral springs acting on said driving member.

The rotary member may be formed with gear teeth meshing with the teeth of a pinion on a pivot shaft carrying the valve disc, and may be mounted for rotation on a second shaft parallel to that carrying the valve disc, the driving member and the springs being fixed to the said second shaft.

The said further member may be rotatable on the second shaft, the latch device comprising a latch member pivoted on a part fixed to said shaft about an axis eccentric to the shaft and having a nose adapted to engage with an abutment face on said further member.

The shaft carrying the one-way drive coupling may be mounted at the end of the expansible and contractable sleeve adjacent the valve seat, and the latch member is so connected by rod means to an anchorage point at the other end of the said sleeve that extension of the sleeve disengages the latch member.

An example of a valve mechanism embodying the invention is shown in the accompanying drawings, in which:

FIGURE 4 is a section on the line 4—4 of FIGURE 2 showing the position of parts of the mechanism when the valve is in the closed position;

FIGURE 5 is a section similar to FIGURE 4 showing the position of the parts when the valve is in the open position;

FIGURE 6 is a section similar to FIGURES 4 and 5 showing the position of the parts when the valve has closed due to extension of the sleeve; and FIGURE 7 is a section on the line 7—7 of FIGURE 2, certain parts in front of the section plane being shown in chain-dotted lines.

Figure 1:
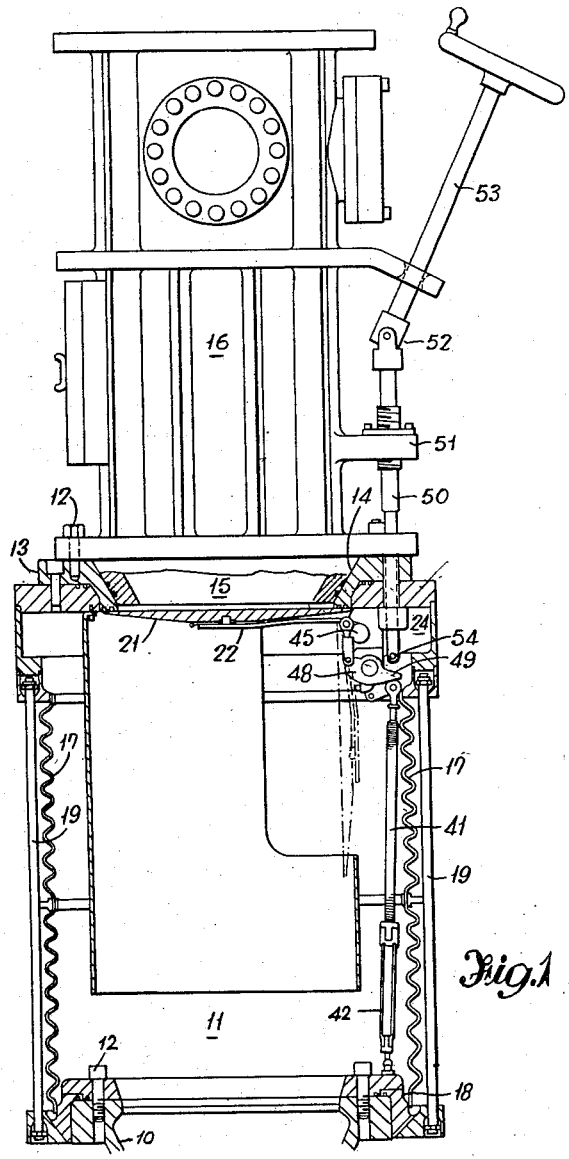
FIGURE 1 is a side elevation, partly in section, of a stack-pile coupling for an atomic reactor including a valve according to the invention.

Referring to FIGURE 1 of the drawings, the outer end of a stack pipe of an atomic reactor is shown at 10, and has a coupling unit 11 secured to its outer end, for example by screws 12. The coupling unit 11 has, at its upper end, a seat ring 13 formed with a frusto-conical seat 14 around a central orifice 15. The orifice 15 is normally closed by a cover plate, not shown, having a frusto-conical portion which engages the seat 14, but, to enable operations to be carried out inside the stack-pipe or the reactor chamber, the cover plate may be removed and replaced by a hollow casing provided internally with a winch or other apparatus for lowering or raising fuel rods, closure plugs and other devices into or out of the stack pipe. One form of hollow casing is shown at 16 in FIGURE 1.

The coupling unit 11 comprises a deformable bellows 17 extending between the seat ring 13 and a lower end ring 18, movement of the rings 13 and 18 away from one another being limited by tension rods 19.

A disc-shaped flap valve 21 is provided to close the orifice 15, so that the said orifice can be closed whilst the cover plate is removed and a casing such as that shown at 16 is mounted thereon, the flap valve 21 being mounted for limited tilting movement on an arm 22 keyed to a spindle 23 carried in a bracket 24 fixed to the inner side of the seat ring 13, so that movement of the arm 22 about the axis of the spindle 23 causes the flap valve to move between a position closing the orifices 15, in which it is shown in full lines in FIGURE 1, and a position in which it hangs down clear of the orifice 15, in which it is shown in chain dotted lines in FIGURE 1.

Figure 2:
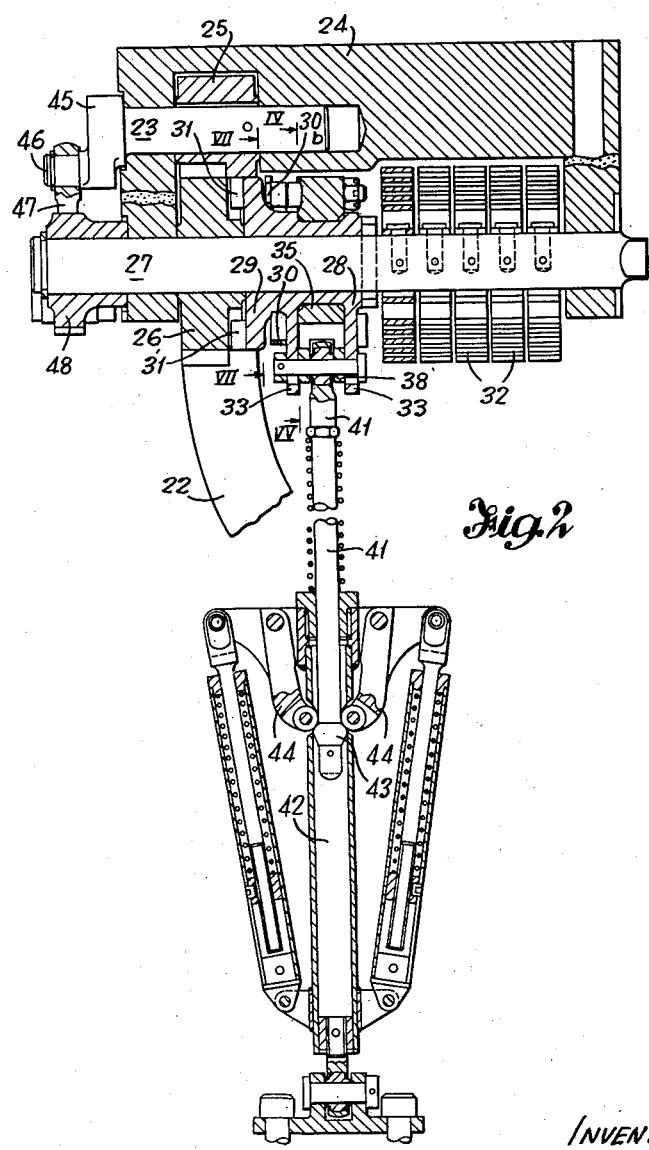
FIGURE 2 is a sectional elevation, on an enlarged scale, of the valve opening and closing mechanism shown in FIGURE 1.
Figure 3:
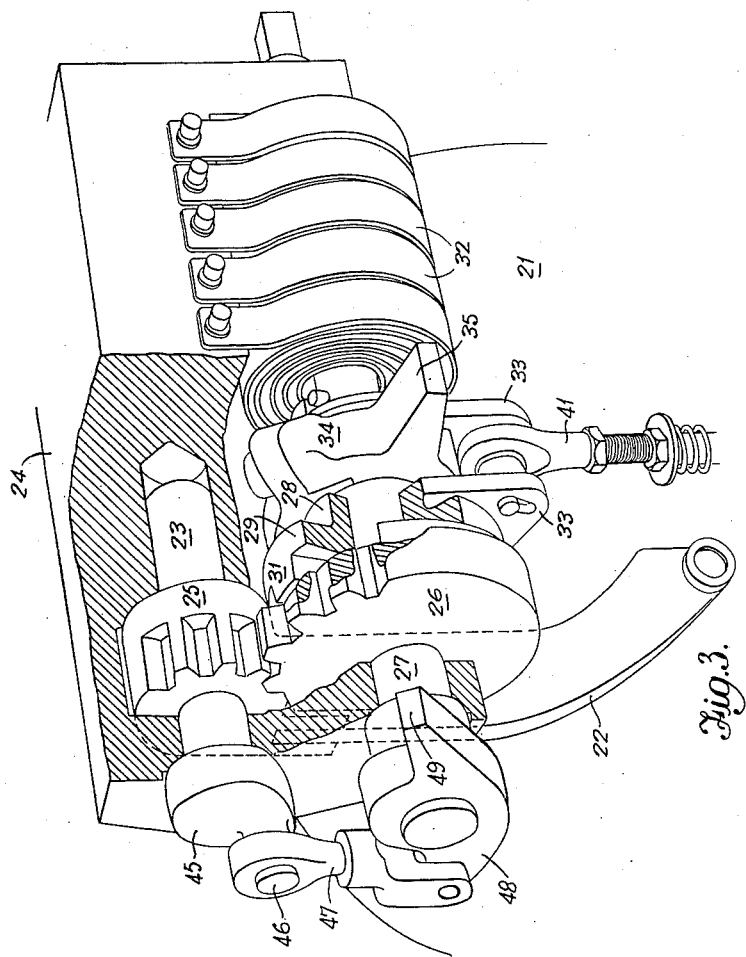
FIGURE 3 is a perspective view of the mechanism shown in FIGURE 2.

As shown in FIGURES 2 and 3, the spindle 23 has keyed to it a pinion 25 meshing with gear teeth on a rotary member 26 freely rotatable on another spindle 27 mounted parallel to the spindle 23. Pinned to the spindle 27 so as to turn therewith is a sleeve 28 formed at one end with a disc 29 carrying dogs 31 which engage in sector-shaped cut-outs in the adjacent face of the rotary member 26. A number of spiral springs 32 are each secured at one end to the bracket 24 and at the other end to the spindle 27, the springs acting on the spindle 27 in such a direction as to rotate the spindle 23, through the dogs 31, the rotary member 26 and the pinion 25, in a direction to close the valve.

The sleeve 28 also has formed integral with it a pair of webs 33 lying in planes perpendicular to the axis of the sleeve, and between the said webs there is mounted, for rotational movement above the sleeve, a member 34 which, as shown in FIGURES 4 to 6, has a substantially radial arm 35 and a step 36 on its periphery. A spring 30 (FIGURES 2 and 7) anchored at its ends at 30a and 30b respectively on the disc 29 and on the member 34, tends to rotate the member 34 relative to the sleeve in an anti-clockwise direction as viewed in FIGURES 4 to 6 and 7. There is also mounted between the webs 33, on a pivot at 37 eccentric to the spindle 27, a lever 38 formed with a nose 39 adapted to cooperate with the step 36 on the member 34 whereby movement of the sleeve 28 relative to the member 34 in the direction (anticlockwise in FIGURES 4 to 6 and 7), in which the former is urged by the springs 32 is prevented.

The lever 38 is pivotally connected at its free end to the upper end of a rod 41 which enters at its lower end into a tube 42 (FIGURES 1 and 2) anchored to the lower end ring 18 of the coupling unit, the said rod 41 carrying, within the tube, a head 43 (FIGURE 2) which cooperates with spring-loaded arms 44 to provide a downward pull on the rod 41 when the coupling unit expands longitudinally to a predetermined degree.

The spindle 23 also carries, on one end, a crank 45 the crank-pin 46 of which is connected, by a connecting rod 47, to a rocker 48 freely mounted on the spindle 27. The rocker 48 includes a projection 49 similar to the radial arm 35 on the member 34.

The hollow casing 16 has externally mounted thereon two rods, one of which is shown at 50 in FIGURE 1, the rods being parallel to the axis of the casing 16, and having screw threaded portions engaging screw-threaded holes in a bracket 51 carried by the casing 16. Each of the rods is adapted to be rotated through a universal joint connecting it to an obliquely mounted rod carrying a hand-wheel, the universal joint and obliquely mounted rod associated with the rod 50 being shown at 52 and 53 respectively.

The rod 50 acts on the upper end of a plunger 54 (FIGURE 1) slidably mounted in the seat ring 13 and arranged to press downwardly on the projection 49 of the rocker 48. The other similar rod acts through a similar plunger 55 (FIGURE 7) on the arm 35, the plungers 54 and 55 being a gas-tight sliding fit in the seat ring 13 and being left behind therein when the casing 16 is taken away.

When the hollow casing 16, or an equivalent casing, is attached to the upper end of the coupling unit, its weight compresses the said unit axially, pushing the rod 41 downwardly in the tube 42 so that the head 43 thereon passes the arms 44.

Assuming that both the rod 50 and its companion rod are retracted upwardly, the springs 32 acting through the pinion 25 and rotary member 26 hold the flap valve 21 against its seat, the sleeve 28, member 34 and lever 38 being in the positions shown in FIGURE 4. If the rod acting through the corresponding plunger, on the arm 35, is moved downwardly, the springs 32 are further tensioned, and the flap valve 21 opens under its own weight, the dogs 31 on the disc 29 remaining in contact with the sides of the cut-outs in the rotary member 26. The movement is transmitted from the member 34 to the sleeve 28 by the lever 38, due to the engagement of the nose 39 on the latter, with the step 36, the parts 28, 34 and 38 moving to the position shown in FIGURE 5. The valve can be re-closed by retracting the operating rod upwardly, the spring load being transmitted to the valve through the dogs 31 and the parts returning to the position shown in FIGURE 4. If, however, an attempt should be made to remove the casing 16 without closing the flap valve, the extension of the coupling unit when the weight of the casing 16 is removed causes a downward pull to be exerted on the rod 41, which disengages the nose 39 from the step 36 and allows the sleeve 28 to turn, independently of the member 34, to close the flap valve, the parts then assuming the positions shown in FIGURE 6. The step 36 is re-engaged with the nose 39 when the plunger 55 is retracted upwardly, the spring 30 causing the member 34 to follow the movement of the plunger until the step passes the nose 39.

The flap valve may be closed independently of the springs 32 by downward movement of the rod 50, which acts on the rocker 48 through the plunger 54, and, through the connecting rod 47 and crank 45, rotates the spindle 23 in a direction to close the valve. The movement of the rotary member 26 which takes place during the closing of the flap valve in this manner, without corresponding movement of the sleeve 28, is allowed for by the movement of the dogs 31 across the segmental cut-outs in the gear wheel 26.

It will be appreciated that the invention is not limited to the particular arrangement described herein by way of example. The flap valve, instead of being pivotally mounted and biased to the open position by its own weight, may have a substantially translational movement and may be urged towards the open position by resilient means of such strength that, whilst able to open the valve when the load of the springs 32 is taken off, are unable to prevent closing of the valve by the springs 32.

We claim:
1. An automatically closing valve disc mounted for movement toward and away from an internal seating at one end of an expansible and contractable sleeve to close and open the passage through the sleeve, a one way drive connection connected to said valve disc, resilient means acting on the valve disc through said one way drive connection to urge it towards the internal seating, and biasing means acting on the valve disc to move it away from the seating when the load of the resilient means is removed, the one way drive connection including a driving member, means to displace said driving member against the resilience of the resilient means to allow the valve to open and said displacing means including a latch device operatively connected to said driving member and said sleeve to be releasable by expansion of said sleeve to allow closing of said valve by said resilient means.

2. An automatically closing valve according to claim 1, wherein the valve disc is hingedly mounted and the biasing means to move the valve disc away from the internal seating is its own weight.

3. An automatically closing valve according to claim 1 wherein said one way drive connection comprises a rotary member mounted coaxially with the driving member, and the resilient means comprises spiral springs acting on said driving member.

4. An automatically closing valve according to claim 3 whenever the one way drive connection includes a shaft and a driven member mounted on the shaft and movable with the valve disc, the driven member is a pinion and the rotary member is formed with gear teeth meshing with the teeth of said pinion.

5. An automatically closing valve according to claim 4 wherein the one way drive connection includes a second shaft parallel to the shaft carrying the driven member, the rotary member is mounted for rotation on said second shaft, the driving member and the springs being fixed to said second shaft.

6. An automatically closing valve according to claim 5 wherein the displacing means comprises a further member rotatable on the second shaft, said latch device includes a latch member pivoted on said driving member about an axis concentric to the shaft and having a nose adapted to engage with an abutment face on said further member.

7. An automatically closing valve according to claim 6 wherein the shafts of said one way drive connection are mounted at the end of the expansible and contractable sleeve adjacent the valve seat, and the latch member is so connected by rod means to an anchorage point at the other end of the said sleeve that extension of the sleeve disengages the latch member.

8. An automatically closing valve according to claim 7, wherein the rod means includes a rod pivotally connected to the latch member, a tube anchored to the other end of the expansible and contractable sleeve, the rod being slidable in the tube, and means carried by said tube to resist upward movement of the rod at a predetermined relative position of said rod and tube so as to produce a downward pull on the rod when the sleeve is extended.

No references cited.